United States Patent Office 2,771,680
Patented Nov. 27, 1956

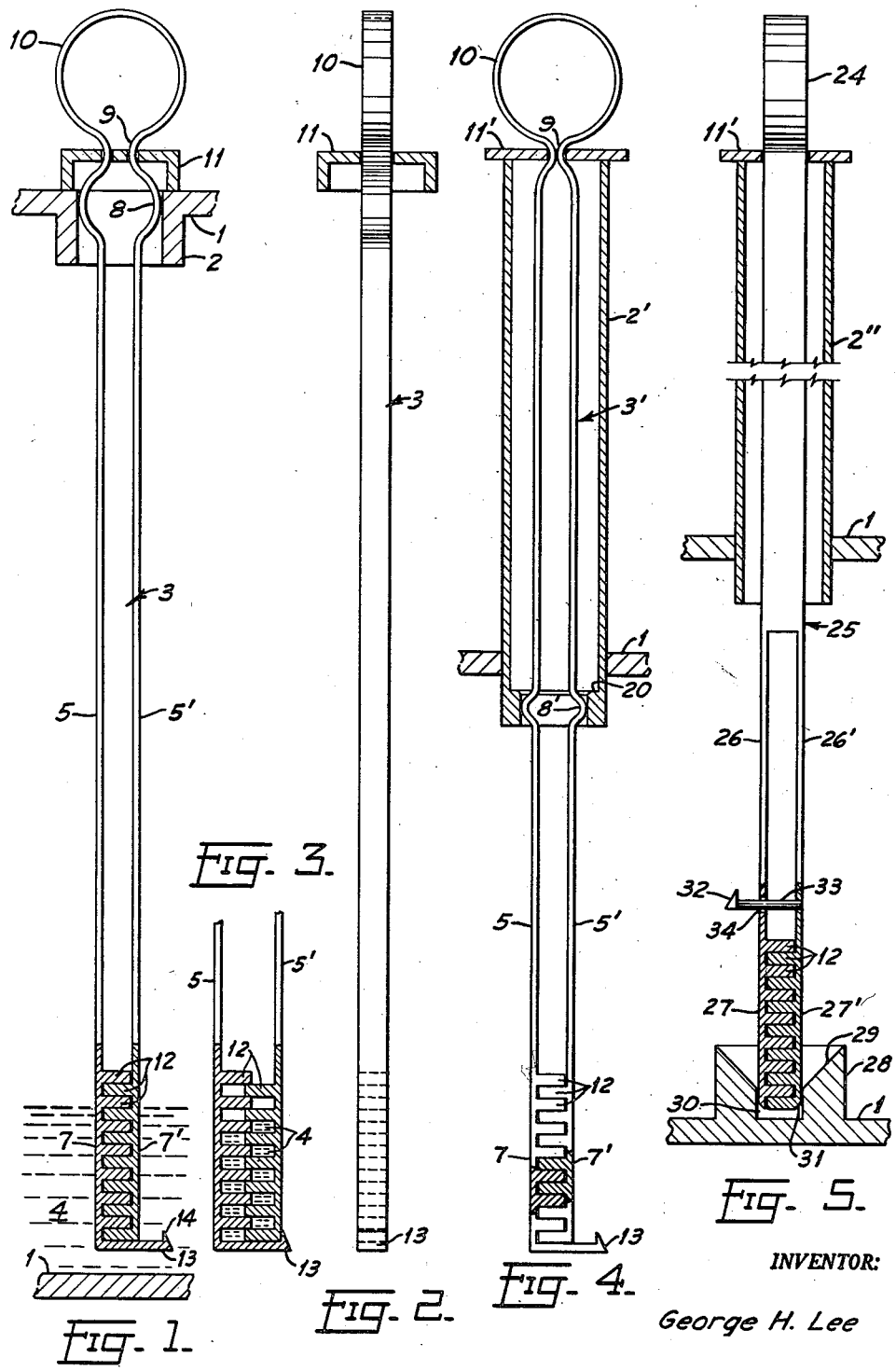

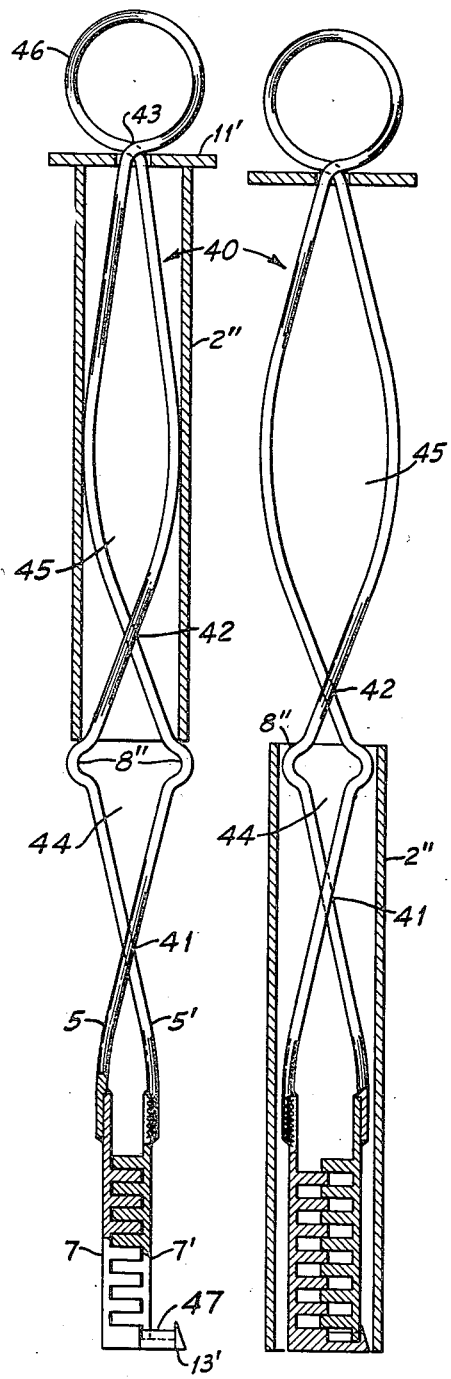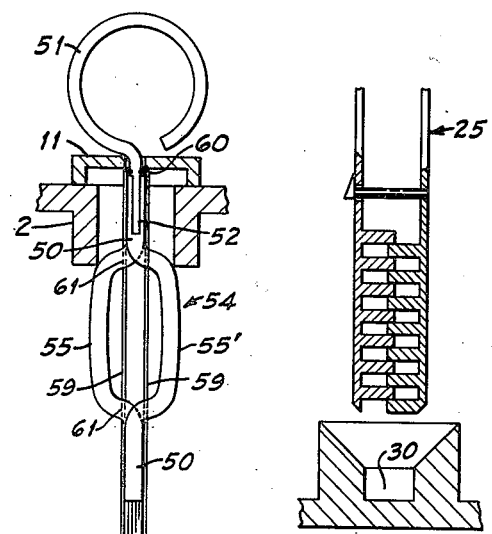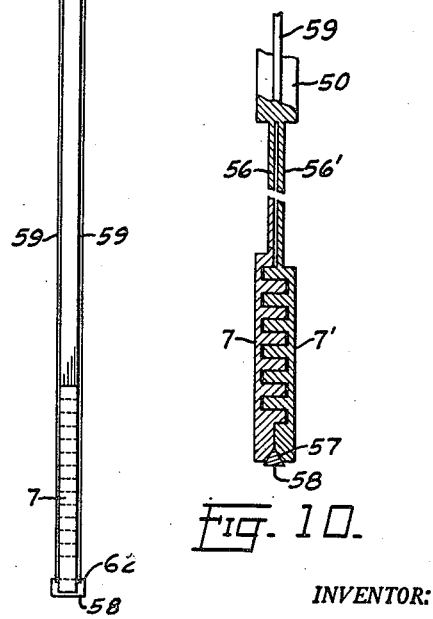

2,771,680

NO-WIPE OIL DIP STICK

George H. Lee, Oak Ridge, Tenn.

Application November 2, 1955, Serial No. 544,425

10 Claims. (Cl. 33—126.4)

This invention relates to an oil level measuring gauge of the type employed to measure the level of oil in the crankcase of an internal combustion engine and commonly referred to as an "oil stick" or "dip stick."

As is known, the procedure for measuring oil level with the conventional type of dip stick is first to remove the stick and wipe it clean, then to fully reinsert the stick, and then to again remove the stick, after which the height of the thin film of oil on the surface of the stick is observed as a measure of the oil level in the crankcase. The preliminary removal and wiping step is necessary in order to avoid an erroneously high reading due to prior sloshing around of the oil in the crankcase or due to a previous higher level of oil at the time of the last reading. The wiping step also removes oil which tends to condense on the entire length of the stick from the oil vapor in the crankcase.

There are several obvious disadvantages associated with the conventional dip stick and its described usage. The preliminary removal and wiping operation is not only time consuming and messy, but it is wasteful of oil and requires the presence of a rag or the like to wipe with. Also, even when the stick is carefully wiped clean, it is still often difficult to locate visually the top of the oil film, and in order to accomplish this, it is sometimes necessary to move the stick around until just the right angle of light reflection into the eyes is obtained.

In order to overcome the difficulty encountered in visually locating the height of the oil film on the dip stick, it has heretofore been proposed to provide, on an otherwise conventional dip stick, a series of holes, or slots, extending entirely through the thickness of the stick, and of sufficiently small transverse dimensions to retain the oil therein by capillary attraction. Such a dip stick works quite well since it is much easier to differentiate between full and empty holes than it is to locate the termination of the very thin film of oil on the conventional dip stick, and it has been used on some cars of standard manufacture. However, a serious disadvantage of such a dip stick is that an undue amount of oil is wasted in the still necessary preliminary cleaning step. An example of such a dip stick is disclosed in U. S. Patent No. 946,695 for Ullage Rod, issued January 18, 1910, to W. L. Dinsmoor.

Dip sticks have also heretofore been suggested wherein, by a separate preliminary manual motion, a wiper, slidably and permanently attached to the dip stick, may be drawn along the surface of the stick, while it is still in place prior to its removal from the crankcase, thereby avoiding the usual preliminary removal step. Such a device is disclosed in U. S. Patent No. 2,254,662, Oil Gauge Rod, issued September 2, 1941, to A. F. Naples et al. This type of dip stick has not been widely adopted, presumably because of the difficulty of obtaining sufficient wiping and cleaning action in this manner and because of its complexity and cost.

Applicant, with knowledge of the defects and disadvantages of the prior art, has, as the principal object of his invention, to provide an oil dip stick which has none of the above described disadvantages of the conventional dip stick, and yet is simple and inexpensive.

Another object of the invention is to provide an oil dip stick which requires no preliminary wiping or cleaning operation at all.

Still another object of the present invention is to provide a dip stick which, in use, is simply pulled out and observed, without the necessity for any other or further manual manipulation.

Still another object of the invention is to provide a dip stick of the type employing openings or holes, such as in the above referred to Dinsmoor patent, the use of which does not involve loss of the oil filling the holes.

The present invention achieves these objects and advantages by providing, as the bottom oil indicating portion of a dip stick, two relatively movable vertically extending elements or legs having facing notched or irregular surfaces adapted to interlock with one another. Means are provided defining two relative positions of the legs, an offset or open position, wherein a series of vertically extending openings or holes are formed by the facing surfaces, and a contiguous or closed position, wherein the facing surfaces coincide and close up the holes. The arrangement is such that the manual act of inserting the dip stick to its fully inserted position automatically causes the legs to close and the openings to disappear, thereby forcing oil out of any openings it may have been held in by capillary attraction. As soon as the manual act of removing the dip stick is initiated, and before the dip stick has moved appreciably, the legs are automatically caused to assume their open position, thereby causing the openings to appear and causing oil to be sucked into these openings to a level corresponding to that of the oil level in the crankcase or container. The oil is then retained in these openings for visual observation by capillary attraction, the legs remaining in their open position except when the dip stick is again inserted to its extreme downward position. Preferably, the legs are relatively movable in a lateral direction, and preferably the means for accomplishing the automatic positioning of the legs in response to insertion and withdrawal of the dip stick comprise spring means for constraining the legs to one of their two positions, and contacting means, cooperable with a portion of the crankcase itself, for forcing the legs to their other position against the spring force. Preferably, the spring means tends to maintain the legs in their open position and the contacting means tends to force the legs to their closed position.

The objects and advantages of the invention, and the operation thereof, will become more apparent from the following detailed description, when taken in connection with the accompanying drawings, wherein, Fig. 1 is an elevation view, partly in section, of the preferred embodiment of the invention, the dip stick being shown in its fully inserted position;

Fig. 2 is a side view, partly in section, of the dip stick of Fig. 1;

Fig. 3 is an elevation view, partly in section, of the liquid level indicating portion of the dip stick of Fig. 1 as it might appear after the dip stick has been entirely removed from the oil container;

Fig. 4 is an elevation view, partly in section, of a modification of the invention, the dip stick being shown in its fully inserted position;

Fig. 5 is an elevation view, partly in section, of another modification of the invention, the dip stick being shown in its fully inserted position;

Fig. 6 is an elevation view, partly in section, of the lower portion of Fig. 5 with the dip stick having been withdrawn upwardly a short distance;

Fig. 7 is an elevation view, partly in section, of still another modification of the invention, the dip stick being shown in its fully inserted position;

Fig. 8 is an elevation view, partly in section, of the dip stick of Fig. 7 in a partially withdrawn position;

Fig. 9 is an elevation view, partly in section, of still another modification of the invention, the dip stick being shown in its fully inserted position; and Fig. 10 is a partial side view, partly in section, of the dip stick of Fig. 9.

Referring now to Figs. 1, 2, and 3 wherein the preferred embodiment of the invention is illustrated, reference numeral 1 designates a crankcase or oil container having a well 2 at its top through which the dip stick 3 can be inserted to measure the level of oil 4. The dip stick, as a whole, is preferably formed as a single piece of spring steel material. As shown, the dip stick 3 is provided with two legs 5, 5' which terminate at their lower ends in two thickened interlocking portions 7, 7', respectively. Above the interlocking portions, the legs 5, 5' extend upwardly in a generally straight and parallel manner until, near the top of the dip stick, they first bow outwardly as at 8, and then neck in as at 9, and then close upon themselves in a large circle 10 which forms a handle or finger ring. Fastened to the dip stick at the neck 9 is an inverted cup shaped cap 11, the lower surface of which forms the usual loose seal with the top surface of the container 1 and defines the maximum downward position of the dip stick.

As indicated, the interlocking portions 7, 7' are formed by thickening the legs 5, 5' somewhat and then cutting a series of spaced notches along their inner facing surfaces, the notches being staggered and alternated so as to form a vertical series of interlocking keys or fingers 12.

The closed position of the legs, shown in Fig. 1, is defined by the interlocking fingers 12 being inserted to their maximum depth in the associated notches. As indicated in Fig. 1, in this closed position, the interlocking portions 7, 7' mate exactly so that they, in effect, become one solid piece.

The open position of the legs, shown in Fig. 3, is defined by a stop 13 which may be formed as a lateral extension of the lowest finger of leg 5. Stop 13 turns upwardly after a short distance to provide a stopping surface cooperating with the lower outer surface of leg 5' when the legs are in their open position, as shown in Fig. 3. The outer surface of stop 13 is beveled outwardly and downwardly from an uppermost point, as indicated at 14, so the stop will not catch against the inner surface of the well 2 when the dip stick is being removed. As indicated in Fig. 3, in the open position of the legs, a double series of vertically extending holes or openings are formed between the facing surfaces of the interlocking portions 7, 7' by means of the interlocking fingers 12, these openings being of sufficiently small dimensions to retain oil by capillary atraction in the manner of the above mentioned Dinsmoor patent.

It will be understood that in the natural unstressed condition of the spring steel dip stick, its legs 5, 5' would be spread wide apart, so that in both open and closed positions there exists a strong spring force tending to separate the legs. In the open position, further separation of the legs is prevented by stop 13.

Whenever the dip stick is not positioned in the container, it is in its open position indicated in Fig. 3. In such position, the distance between the outer surfaces of legs 5, 5' at the bowed portion 8 is somewhat greater than the inner diameter of the well 2. Thus, the dip stick could be partially inserted in the well and permitted to stop just short of its maximum downward position with the lower part of the bowed portion 8 resting against the top surface of the container 1. When the dip stick is then forcibly fully inserted to its maximum downward position, the bowed portion 8 is forced down into the well 2, thus forcing the legs 5, 5' inwardly to their closed position, as shown in Fig. 1. This is the normal position of the dip stick when the car is in use. It will be noted that the bowed portion 8, besides serving to force the legs together, also serves, by means of its frictional pressure contact against the walls of well 2, to retain the dip stick in its fully inserted position during car movement. As is well known dip sticks are conventionally provided with some such retention mechanism, an example of one conventional arrangement being indicated at 54 in Fig. 9.

Now, if it is desired to measure the oil level at any time, the dip stick is simply removed from the crankcase and the oil level observed by noting the uppermost opening containing oil. It will be apparent that as soon as upward movement of the dip stick begins, and before the dip stick has moved upwardly appreciably, the bowed portion 8 will move out of the well 2, thereby releasing the legs 5, 5' to the open position of Fig. 3. Oil will be sucked into those openings which are at that time below the oil level, and will be retained there for observation by capillary attraction, as indicated in Fig. 3. After the oil level is read, the dip stick is reinserted to its maximum downward position, thereby coercing the legs again to their closed position.

By forming the dip stick proper of the usual bar stock having a quarter of an inch or so width in the direction perpendicular to the paper in Fig. 1, as shown in Fig. 2, the dip stick is provided with sufficient rigidity in this direction that the interlocking portions 7, 7' cannot separate in this direction. It might be desirable, however, to form the dip stick proper simply of spring steel wire of perhaps a sixteenth of an inch diameter. In such case, the interlocking portions 7, 7' would preferably be made of separate pieces and permanently attached to the legs in any suitable manner. Also in such case, a guide of some kind, such as guide 47 of Fig. 7, hereinafter to be described, would preferably be provided to insure that the interlocking portions remain in the same vertical plane.

In some of the newer model cars, the well is extended upwardly a considerable distance above the crankcase in the form of a tube to provide more convenient access for inserting the dip stick. In such case, the dip stick necessarily is quite long and somewhat flexible. While the dip stick of Figs. 1–3 could be made to work under such circumstances, it will be apparent that the fact that the control for the movement of the lower interlocking portions 7, 7' derives from the bowed portion 8 at the top requires that this control be exerted through the entire length of the dip stick. This, in turn, would require rather close dimensional and spring tolerances when applied to an extremely long dip stick. The separate modifications of Fig. 4; Figs. 5 and 6; and Figs. 7 and 8 are directed to embodiments of the invention especially adapted to use with such elongated tubular wells. The mcdfication of Figs. 7 and 8, like that of Figs. 1–3, requires no modification of the crankcase or the crankcase well of the car.

Referring now to the modification of Fig. 4, there is shown a dip stick 3' inserted to its maximum downward position into a long tubular well 2' of the type referred to in the preceding paragraph. The well 2' is modified, however, from the standard design in being provided, at or near its lower extremity, with an annular ring or insert 20 of smaller internal diameter than the well 2'. The dip stick 3' differs from that described with respect to Figs. 1–3 in that the cap 11' is flat instead of cup shaped, and in that the bowed portion 8' is located near the middle of the dip stick at a position permitting it to contact the insert 20 when the dip stick is in its lowermost position, as indicated in Fig. 4. The operation of the modification of Fig. 4 is exactly the same as was described with respect to the modification of Figs. 1–3, the insert 20 in Fig. 4 corresponding in function to that of the well 2 of Figs. 1–3, it being understood that, in this case, the maximum transverse dimension of bowed portion 8', when legs 5, 5' are in their open position, is greater than the inner diameter of insert 20 but less than the inner diameter of well 2'.

Referring now to the modification of Figs. 5 and 6, in this case an elongated tubular well 2" of standard design is shown in Fig. 5 having inserted therein to its maximum downward position a dip stick 25 formed from rectangular bar stock of spring steel material. The entire portion of the dip stick above the bottom of the well 2" may be conventional, it being formed of a single piece terminating in a loop forming a finger ring 24 and having the conventional cap 11'. Below the bottom of the well 2", the bar stock forming the dip stick is divided to form the two spaced legs 26, 26' characteristic of the present invention. The legs 26, 26' terminate at their lower ends in the interlocking portions 27, 27' having interlocking fingers 12, as in the preceding modifications of the invention.

In the present case, there is especially provided at the bottom of the crankcase, in a position to receive the dip stick, an upstanding annular element 28 having a reentrant conical surface 29, which conical surface terminates in a cylindrical well 30 of a diameter such that the dip stick will just fit into same when in its closed position. The bottom outer edges of the interlocking portions 27, 27' are chamfered, as at 31, to facilitate the sliding of the dip stick down the conical surface 29 and into the well 30.

A stop 32, similar in function to stop 13 of Fig. 1, is provided to restrain the legs from springing apart beyond their open position. In this case, the stop 32 is supported from a small diameter pin 33 which extends through a hole 34 in leg 26 and is attached to leg 26'. It will be noted that this stop arrangement, besides providing the necessary restriction on the lateral separation of legs 26, 26', also maintains those legs in the same vertical plane.

The operation of the modification of Figs. 5 and 6 is similar to that described with respect to the previous modifications. Insertion of the dip stick to its full depth forces the bottom of the interlocking portions 27, 27' into well 30 and automatically forces the legs to their closed positions, as shown in Fig. 5. During removal, because of the spring force tending to spread the legs, the dip stick automatically assumes the open position shown in Fig. 6 as soon as its lower portion clears well 30.

In Figs. 7 and 8, there is shown a modification of the invention which is especially adapted for use with a standard elongated tubular well 2", but which does not require any modification of either the crankcase or its well. The dip stick 40 in this case is shown formed of a single piece of spring wire stock terminating in the two legs 5, 5' and attached interlocking portions 7, 7'. The stop 13', in this case, extends upwardly a little beyond the bottom of the interlocking portion 7' on both sides thereof to provide a guide 47 for portion 7' to maintain portions 7, 7' in the same plane, somewhat in the manner of the clasp and guide arrangement of an ordinary safety pin. As previously indicated, some such guide may be necessary to provide stability in a direction normal to the paper whenever the legs 5, 5' are especially long or whenever the legs do not have an appreciable dimension in the direction into the paper.

In this modification, the spring wire forming the dip stick crosses back over itself at points 41, 42 and 43 to form three loops 44, 45, and 46, respectively. Loop 46 forms the finger ring or handle. Crossover point 43 forms a neck to which cap 11' is attached. Loop 45 is an extended one which lies wholly within well 2" when the dip stick is inserted to its maximum downward position, as shown in Fig. 7. In this fully inserted position, the mid point of loop 44 is located near the bottom of well 2", and this loop 44 is locally bowed out, as at 8", just below the bottom of well 2".

As in the previous modifications, spring tension tends to spread legs 5, 5' wide apart, but the separation therebetween is limited by stop 13'. The configuration of the dip stick when restrained only by the stop 13' is as shown in Fig. 8. This is the configuration when the dip stick is completely removed from the well 2". It is noted, that such configuration constitutes an open position of the legs 5, 5'. Since the bowed portion 8" is smaller than the internal diameter of the well 2" in this position, the dip stick can, without force, be inserted into the well until the loop 45 bears against the top of the well 2". Now when the dip stick is forced farther into the well, to the point where the midpoint of loop 45 as well as bowed portion 8" are both within the well, the resulting forced compression of loop 45 tends to expand the bowed portion 8" to a dimension greater than that of the well 2", that is, to the dimension it has in Fig. 7. But this expansion of bowed portion 8" cannot occur at this time because it is restrained by the walls of the well. This situation will continue to obtain until the dip stick reaches its maximum downward position shown in Fig. 7, at which time the bowed portion 8" clears the well and expands. Expansion of the bowed portion 8", causes the interlocking portions 7, 7' to close, that is, to assume the position shown in Fig. 7.

Upon removal, the dip stick assumes its open position as soon as the bowed portion 8" is drawn into the well 2". Subsequently, when the loop 45 is withdrawn from the well, the dip stick assumes the configuration shown in Fig. 8, which also constitutes an open position of the dip stick.

The modification of Figs. 9 and 10 operates in a somewhat different manner from the foregoing modifications. In this modification, the dip stick is formed essentially of two separate pieces 50 and 51 of rectangular bar stock. The two pieces 50 and 51 are interconnected by a tongue and groove arrangement, as at 52, to be vertically slidably movable with respect to each other, but to be otherwise rigid. Piece 51 folds over on itself at the top to form a finger ring and has attached to it the usual cap 11. Below the tongue and groove arrangement 52, piece 50 has the type of spring friction retention mechanism 54 employed in most conventional dip sticks. As is well known, retention mechanism 54 is very simply formed by striking an elongated central portion 55 out of the plane of the bar stock and by oppositely striking the two elongated portions 55' located on opposite sides of the portion 55. Contrary to conventional usage of this retention mechanism, however, in the present case, it lies below the well 2, but bearing against the lower surface of the well 2, when the dip stick is in its lowermost position, as shown in Fig. 9.

Piece 50 terminates at its bottom in two legs 56, 56' which, in turn, terminate in the interlocking portions 7, 7', as in the previously described modifications. In this case, however, the inner bottom edges of interlocking portions 7, 7' are chamfered, as at 57, so as to accommodate a wedge member 58. A pair of vertically elongated rigid rods 59 are attached to opposite sides of the wedge member, as indicated at 62, and extend upwardly therefrom to piece 51 to which they are attached, as indicated at 60, in any convenient manner. The left most of the pair of rods 59 passes through slots 61 formed in the centrally positioned struck out portion 55 of retaining mechanism 54.

The dip stick is shown in Figs. 9 and 10 with both pieces 50 and 51 in their maximum downward position. Contrary to previous modifications, the natural spring tension of legs 56, 56' in this case is such as to tend to force the interlocking portions 7, 7' to their closed position. When the dip stick is withdrawn, the piece 50 and connected interlocking portions 7, 7' are at first held in their indicated position vertically by retention mechanism 54, but piece 51, rods 59, and wedge member 58 are free to move upwardly. Upward movement of wedge member 58 with respect to interlocking portions 7, 7' forces these portions to their open position. It will be noted that, in this case, the interlocking portions 7, 7' are caused to assume their open position prior to even a minor vertical movement of these portions. Continued upward movement of piece 51 causes the apex of wedge member 58 to bear against the lowermost finger of interlocking portion 7, whereupon pieces 50 and 51 thereafter move upwardly together as a unit, wedge member 58 remaining in its upper position relative to interlocking portions 7, 7' to thereby retain these portions in their open position. During reinsertion of the dip stick, the two pieces 50 and 51 will move downwardly as a unit until the lower part of retention mechanism 54 contacts the upper surface of well 2, at which time piece 50 will temporarily stop. Piece 51 and attached rods 59 and wedge member 58 will then move to their maximum downward position relative to piece 50, thereby disengaging wedge member 58 from between the interlocking portions 7, 7', permitting the interlocking portions to spring to their closed position, and causing pieces 50 and 51 to again move downwardly as a unit. Further insertion of the dip stick forces the retention mechanism 54 to pass through well 2 to the maximum downward position shown in Fig. 9.

Since many changes could be made in the above construction, and many apparently widely different embodiments of this invention could be made without departing from the scope thereof, it is intended that all matter contained in the above description, or shown in the accompanying drawings, shall be interpreted as illustrative and not in a limiting sense.

What is claimed is:

1. An oil dip stick adapted to be inserted into an oil container through a well in the top thereof to measure the level of oil in said container comprising an elongated vertically extending member having, as its lower oil measuring portion, a pair of relatively movable legs having irregular cooperating surfaces, and means defining two possible relative positions of said legs, an open position and a closed position, in the open one of which positions the cooperating surfaces are slightly offset from one another to form a vertically extending series of oil retaining holes, and in the closed one of which positions the cooperating surfaces mate with one another to close up the said holes.

2. An oil dip stick adapted to be inserted into an oil container through a well in the top thereof to measure the level of oil in said container comprising an elongated vertically extending member having, as its lower oil measuring portion, a pair of vertically extending relatively movable legs, said legs each having a vertically extending series of extending fingers, the fingers on one leg being positioned to interlock with the fingers on the other leg, and means defining two possible relative positions of said legs, an open position and a closed position, in the open one of which positions the interlocking fingers form a vertically extending series of oil retaining holes, and in the closed one of which positions the two legs effectively form a unitary solid piece so that the holes disappear.

3. An oil dip stick adapted to be inserted into an oil container through a well in the top thereof to measure the level of oil in said container comprising an elongated vertically extending member having, as its lower oil measuring portion, a pair of generally parallel vertically extending relatively transversely movable legs, said legs each having a vertically extending series of transversely extending fingers, the fingers on one leg being positioned to interlock with the fingers on the other leg, and means defining two possible relative positions of said legs, an open position and a closed position, in the open one of which positions the interlocking fingers form a vertically extending series of oil retaining holes, and in the closed one of which positions the two legs effectively form a unitary solid piece so that the holes disappear.

4. An oil dip stick adapted to be inserted into an oil container through a well in the top thereof to measure the level of oil in said container comprising an elongated vertically extending member having, as its lower oil measuring portion, a pair of generally parallel vertically extending relatively transversely movable legs, said legs each having a vertically extending series of transversely extending fingers, the fingers on one leg being positioned to interlock with the fingers on the other leg, means defining two possible relative positions of said legs, an open position and a closed position, in the open one of which positions the interlocking fingers form a vertically extending series of oil retaining holes, and in the closed one of which positions the two legs effectively form a unitary solid piece so that the holes disappear, and means cooperable with a portion of said container for causing said legs to assume their closed position whenever the dip stick is fully inserted and their open position whenever the dip stick is withdrawn.

5. An oil dip stick adapted to be inserted into an oil container through a well in the top thereof to measure the level of oil in said container comprising an elongated vertically extending member having, as its lower oil measuring portion, a pair of generally parallel vertically extending relatively transversely movable legs, said legs each having a vertically extending series of transversely extending fingers, the fingers on one leg being positioned to interlock with the fingers on the other leg, means defining two possible relative positions of said legs, and open position and a closed position, in the open one of which positions the interlocking fingers form a vertically extending series of oil retaining holes, and in the closed one of which positions the two legs effectively form a unitary solid piece so that the holes disappear, said legs being under a spring tension tending to cause said legs to normally assume their open position, and means cooperable with a portion of said container for coercing said legs to their closed position whenever the dip stick is fully inserted.

6. An oil dip stick, as claimed in claim 5, wherein said last-named means is disposed toward the top of said dip stick and is cooperable with the well of said container.

7. An oil dip stick, as claimed in claim 5, wherein said last-named means is disposed toward the middle of said dip stick and is cooperable with the well of said container.

8. An oil dip stick, as claimed in claim 5, wherein said last-named means is disposed at the bottom of said dip stick and is cooperable with the bottom of said container.

9. An oil dip stick adapted to be inserted into an oil container through an elongated tubular well in the top thereof to measure the level of oil in said container comprising a finger ring, a pair of spring wires extending downwardly from said ring and crossing over each other twice to form an upper and a lower loop, the midpoint of said lower loop being disposed below the bottom of said well in the fully inserted position of the dip stick, said upper loop being disposed entirely within said well in the fully inserted position of the dip stick, said wires terminating at their lower ends in a pair of generally parallel vertically extending relatively transversely movable legs, said legs each having a vertically extending series of transversely extending fingers, the fingers on one leg being positioned to interlock with the fingers on the other leg, means defining two possible relative positions of said legs, an open and a closed position, in the open one of which positions the interlocking fingers form a vertically extending series of oil retaining holes, and in the closed one of which positions the two legs effectively form a unitary solid piece so that the holes disappear, the natural configuration of said spring wires, when said dip stick is entirely free of said well, being such that the maximum transverse dimension of said upper loop is substantially greater than the internal diameter of said well, the maximum transverse dimension of said lower loop is less than the internal diameter of said well, and said legs are in their open position.

10. An oil dip stick adapted to be inserted into an oil container through a well in the top thereof to measure the level of oil in said container comprising an upper and a lower member, a tongue and groove connection between said members permitting limited relative vertical movement only therebetween, said upper member terminating upwardly in a finger ring, said lower member having spring retention means cooperable with said well for tending to retain said lower member in said container, said lower member having a lower oil measuring portion comprising a pair of generally parallel vertically extending relatively transversely movable legs, said legs each having a vertically extending series of transversely extending fingers, the fingers on one leg being positioned to interlock with the fingers on the other leg, said legs being under natural spring tension tending to maintain said legs in a closed position wherein the fingers interlock and mate, a wedge member vertically movable with respect to said legs and adapted, upon upward movement, to force said legs to an open position wherein the interlocking fingers form a vertically extending series of oil retaining holes, and means forming a rigid interconnection between said wedge member and said upper member.

References Cited in the file of this patent
UNITED STATES PATENTS

| | | |
|---|---|---|
| 323,057 | Meylor | July 28, 1885 |
| 1,078,847 | Grauenfels | Nov. 18, 1913 |